United States Patent
Burks et al.

(10) Patent No.: US 8,133,419 B2
(45) Date of Patent: Mar. 13, 2012

(54) METHOD FOR MAKING AUTOMOTIVE HEADLINERS

(75) Inventors: Stephen R. Burks, Essexville, MI (US);
Rogelio R. Gamboa, Brazoria, TX (US);
Richard G. McNeil, Corunna (CA); K. Joanne Bladon, Sarnia (CA); Armando Esau Toledo Gonzalez, Apizaco (MX)

(73) Assignee: Dow Global Technologies LLC, Midland, MI (US)

( * ) Notice: Subject to any disclaimer, the term of this patent is extended or adjusted under 35 U.S.C. 154(b) by 1373 days.

(21) Appl. No.: 11/639,559

(22) Filed: Dec. 15, 2006

(65) Prior Publication Data
US 2007/0151652 A1    Jul. 5, 2007

Related U.S. Application Data

(60) Provisional application No. 60/751,581, filed on Dec. 19, 2005.

(51) Int. Cl.
*B29C 67/00* (2006.01)
(52) U.S. Cl. ........ 264/46.4; 264/415; 264/41; 264/45.1; 264/45.3; 264/46.7; 264/46.8; 264/135; 264/134; 264/21; 264/136; 264/239; 264/240; 264/241
(58) Field of Classification Search ........... 264/46.4, 264/135, 134, 21, 415, 41, 45.1, 45.3, 46.7, 264/46.8, 136, 239, 240, 241
See application file for complete search history.

(56) References Cited

U.S. PATENT DOCUMENTS

| 3,723,367 | A | * | 3/1973 | Chow et al. | 521/117 |
|---|---|---|---|---|---|
| 4,686,240 | A | * | 8/1987 | Bailey et al. | 521/103 |
| 4,871,612 | A | * | 10/1989 | Okina et al. | 442/225 |
| 5,833,304 | A | | 11/1998 | Daniel et al. | |
| 6,204,209 | B1 | | 3/2001 | Rozek et al. | |
| 6,500,369 | B1 | * | 12/2002 | Gorowicz et al. | 264/46.5 |
| 6,887,552 | B2 | | 5/2005 | Dykman et al. | |
| 6,939,491 | B2 | | 9/2005 | Brown et al. | |
| 2003/0018096 | A1 | * | 1/2003 | Lekovic et al. | 521/155 |
| 2004/0235376 | A1 | | 11/2004 | Byma et al. | |
| 2004/0235378 | A1 | | 11/2004 | Byma et al. | |

FOREIGN PATENT DOCUMENTS

| WO | WO 01/54949 | 8/2001 |
|---|---|---|
| WO | WO 02/04252 | 1/2002 |
| WO | WO 02/42119 | 5/2002 |
| WO | WO 2004/080710 | 9/2004 |

* cited by examiner

*Primary Examiner* — Christina Johnson
*Assistant Examiner* — Stella Yi
(74) *Attorney, Agent, or Firm* — Gary C Cohn PLLC

(57) ABSTRACT

Vehicle headliners are prepared with a core layer of a fiber-reinforced polyurethane foam. The polyurethane foam is prepared from a polyurethane-forming composition that uses water as a blowing agent and polyol or polyol mixture that has a high functionality and an average hydroxyl equivalent weight of 100-130. The selection of polyols permits cycle times to be reduced by allowing for faster demolding and shortened aging times before post-molding heat lamination steps can be performed.

19 Claims, No Drawings

METHOD FOR MAKING AUTOMOTIVE HEADLINERS

CROSS-REFERENCE TO RELATED APPLICATION

This application claims benefit of U.S. Provisional Patent Application 60/751,581, filed 19 Dec. 2005.

BACKGROUND OF THE INVENTION

This invention relates to headliners for vehicles such as trucks and automobiles.

Headliners are used in the passenger compartments of various types of vehicles. They provide an aesthetically pleasing appearance, acoustical and vibrational damping, and in some cases incorporate energy-absorbing components intended to reduce risk of injury in a collision or other accident. The headliner may also provide a certain amount of structural reinforcement to the vehicle. To achieve these things, the headliner in many cases includes a structural polymer foam component. Various types of headliner designs are described in U.S. Pat. Nos. 5,833,304, 6,204,209, 6,887,552 and 6,939,491, US Published Patent Applications No. 2004/0235376 and 2004/0235378, and WO publications 2001/54949, 2002/04252, 2002/42119 and 2004/80710.

WO 2002/04252 describes a headliner that includes a "urethane matrix". The urethane matrix includes a layer of fiberglass impregnated with a polyurethane foam. This matrix is formed by spraying a foam-forming composition onto the fiberglass layer. Additional layers are applied to each side of the urethane matrix, and the entire assembly is then placed into a heated mold, in which the foam-forming composition cures and the various layers become adhered together.

The manufacturing process described in WO 2002/04252 can yield good quality headliners, but manufacturing costs are higher than desired. Production rates are a primary cause of the excessive costs. Two factors play a significant role in production rates. The first of these is the so-called "demold time", which refers to the amount of time the polyurethane foam formulation must be cured in the mold in order to form a dimensionally stable part. Parts that are demolded too soon often exhibit post-demold expansion, and become distorted or do not fit properly with other components of the headliner or with other parts of the vehicle. Polyurethane foam formulations that have been used in this process generally require 90 seconds or more of residence time in the mold.

A second factor that significantly affects production rates is the length of time after demolding that the part must be aged before being assembled to other components. A downstream process of particular interest involves a thermal bonding lamination step, in which a show surface is bonded to the composite. The bonding layer is typically an adhesive film that is bonded to the surface of the part during the molding step. If the lamination step is performed too soon after demolding, the polyurethane foam tends to degas during the lamination step. This leads to bubble formation at the interface of the adhesive and the polyurethane foam, as well as distortion of the part. Therefore, it is commonly necessary to hold the molded parts for 2 hours or more before this lamination step is performed.

The long demold times limit the capacity of the equipment—therefore, fewer production lines would be needed if the demold time could be reduced. The long hold times mean that parts have to be stored and inventoried, and introduce complexities (with associated costs) to the sequencing of the molding step and subsequent lamination process.

For these reasons, it would be desirable to reduce the demold times and reduce the post-molding holding time that are required in this process. In so doing, it is necessary to maintain the other performance attributes of the headliner assembly, including its physical properties and integrity.

SUMMARY OF THE INVENTION

This invention is a process comprising
a) applying a foamable polyurethane composition onto a mat of at least one reinforcing fiber to form an impregnated mat,
b) molding the impregnated mat at an elevated temperature sufficient to cure the polyurethane composition, to form a molded, fiber-reinforced polyurethane foam, and
c) demolding the fiber-reinforced polyurethane foam,
wherein the foamable polyurethane composition includes a polyol or mixture of polyols, a polyisocyanate and about 3.0 to about 5.5 parts of water per 100 parts by weight of polyol(s), wherein the polyol or mixture of polyols has an average of 3.8 to about 8 hydroxyl groups/molecule and a hydroxyl equivalent weight of about 100 to about 135, and further wherein the polyisocyanate index is from 90 to 130.

In preferred embodiment, an adhesive film is applied to at least one surface of the fiber-reinforced polyurethane foam, and the fiber-reinforced polyurethane foam is heat-bonded to a show surface in a subsequent step.

The make-up of the polyurethane composition, and in particular the selection of polyol hydroxyl equivalent weight and functionality together with the use of high levels of water, is important in achieving faster demold times and reduced hold times. Demold times are typically reduced from about 90 seconds to the order of 60 seconds or even less. This reduction in demold times greatly increases equipment capacity. A further benefit is that the fiber-reinforced polyurethane foam is less susceptible to degassing during a subsequent heat-bonding step and is thus less prone to form bubble or become distorted. A main practical effect of this is that holding times can be reduced quite substantially, from about 2 hours for conventional systems to as low as 20 minutes or even less. This reduces inventory, storage and sequencing costs.

In another preferred embodiment, the polyurethane composition contains a catalyst package comprising one or more tertiary amine catalysts, but is essentially devoid of so-called "blowing" catalysts that are highly active in catalyzing the reaction of water with isocyanate groups. The use of such a catalyst package has been found to provide the polyurethane composition with curing characteristics that are particularly beneficial in this application.

DETAILED DESCRIPTION OF THE INVENTION

The fiber-reinforced polyurethane foam of the invention is formed by applying a polyurethane-forming composition to a fiber mat, and then curing the polyurethane-forming composition in a mold.

The polyurethane-forming composition is most conveniently applied to the fiber mat in a continuous fashion. The fiber mat is most conveniently supplied as a rolled good, and is fed via a series of rollers, a moving belt, a tenter frame or other suitable apparatus to a station at which the polyurethane-forming composition is applied. The manner of applying the polyurethane-forming composition is not particularly critical, provided that the composition achieves good penetration into the mat and in particular between the fibers of the mat. Spraying is a preferred method of applying the polyurethane-forming composition. The polyurethane-forming composition is generally sprayed onto the fiber mat while at approximately room temperature (e.g., 15-30° C.), a slightly elevated temperature (such as 30-50° C.) or a slightly reduced temperature (e.g. 0-15° C.). The mat is conveniently at a temperature of from 0-50° C. when the polyurethane-forming composition is applied. Preheating the components and/or the mat to higher temperatures before applying the polyurethane-forming composition tends to accelerate the curing reaction more than is desired.

Additional, optional layers may be applied at this stage if desired. For example, a reinforcing scrim or other reinforcing layer may be applied to either or both sides of the polyurethane-impregnated mat. Various types of film layers may be applied, again to either or both sides of the laminate. An adhesive film is one of particular interest. As before, these are most conveniently applying by providing the layer material in the form of a rollstock which is fed continuously into the manufacturing process. These optional layers may be applied simultaneously with, before, or just after the application of the polyurethane-forming composition to the fiber mat.

Apparatus and processing steps as illustrated in FIGS. 3 and 4 of WO 2002/04252 are readily adapted for producing the polyurethane-impregnated fiber mat of this invention, although the product described in WO 2002/04252 includes exterior reinforcing layers that are only optional to (but preferred in) this invention.

The impregnated mat (and other optional layers, if any) is placed into a mold, in which the polyurethane-forming composition is cured and the assembly is formed into a desired shape. This is suitably done as soon as possible after applying the polyurethane-forming composition to the fiber mat, so that expansion of the composition occurs mainly within the mold. The time from when the polyurethane-forming composition is applied until the time that the mold is closed is preferably no greater than 30 seconds, more preferably from 1 to 25 seconds, and even more preferably from 5 to 20 seconds.

The mold suitably includes a lower forming tool or die, over which the impregnated mat is positioned, together with any optional layers that have been added to the assembly at this point of the process. An upper forming tool or die is then closed over the impregnated mat. The forming tools together define an interior space that conforms to the desired shape and dimensions of the resulting composite. During the curing step, sufficient pressure is applied to the mold to keep it closed as the polyurethane-forming composition expands. A mold release agent or other means for preventing the polyurethane from adhering to the interior surfaces of the mold may be applied prior to inserting the impregnated mat.

The polyurethane-forming composition cures and foams within the mold to form a cellular polyurethane that encompasses the fiber mat. To promote the cure, the mold is preferably brought to an elevated temperature, although curing can take place in a room-temperature mold. The mold temperature is suitably in the range of from 35 to 80° C., and is preferably in the range of from 60 to 75° C. An especially preferred temperature range is from 70 to 75° C. When an optional adhesive polymer film layer is present, the curing temperature is further selected in combination with the melting temperature of the adhesive film layer, so that the adhesive film layer does not melt during the molding process. The adhesive film layer may become softened enough to be shaped during the molding step.

An advantage of this invention is that the polyurethane composition cures quickly within the mold, resulting in a short "demold time". Demold time is the elapsed time between the time the mold is closed and the minimum time at which the molded part can be demolded. The demold time is the time required to cure the polyurethane-forming composition sufficiently that (1) the molded part can be removed from the mold and handled without losing its shape and without loss of physical integrity and (2) the demolded part exhibits no more than 0.75 mm linear post-demold expansion when stored at about 22° C. The post-demold expansion is measured in the direction of the thickness of the part (typically the smallest dimension, corresponding to the depth of the mold and the direction of expansion of the foam in the mold). Demold times of less than 80 seconds, especially less than 70 seconds and preferably less than 60 seconds are readily achieved with this invention. A preferred demold time is in the range of 40 to 60 seconds, especially from 40 to 55 seconds.

In certain embodiments, the molded, fiber-reinforced foam so made is subsequently laminated to one or more additional layers of material after it is demolded. Of particular interest for headliner applications are various types of show surfaces, which may be, for example, a woven or nonwoven fabric, a polymer film or sheet (such as a vinyl sheet), or natural or synthetic leather. The show surface is often backed with a thin layer of a polymeric foam in order to provide a softer cushion and appearance.

The lamination of the fiber-reinforced foam to the additional layer or layers can be performed by gluing or through a heat-lamination process. This invention has particular applicability for making composites that undergo subsequent processing involving exposure to an elevated temperature of 125° to 200° C., in that the composite may be exposed to such temperatures without undergoing undesirable expansion or distortion, only a short time after being demolded. Typically, the post-demold aging time that is required before the composite is subjected to such temperatures is no greater than one hour, and is usually 30 minutes or less or even 20 minutes or less. Thus, a process of particular interest is one in which the composite is subjected to a post-demold process in which it is exposed to processing temperatures in the range of 125-200° C., especially 140-175° C., in a period from about 10 minutes to about one hour, especially from 10 minutes to 30 minutes, and most preferably from about 10 minutes to 20 minutes, after being demolded.

A heat-lamination process, and especially one in which the composite is laminated to a show surface, is conveniently conducted by bringing the composite and the additional layer into contact and exposing them to the aforementioned temperatures, usually under a slight pressure to ensure that the additional layer is placed into contact with the composite and becomes securely adhered it the composite. Pressure can be applied using conventional apparatus such as a double band laminator, a series of nip rollers and the like.

In an especially preferred process, the additional layer and the composite are bonded together through an adhesive film as described before. As described before, this adhesive film is suitably applied to the composite during the preceding molding step and so becomes conformed to the exterior contours of at least a portion of the composite. In such a case, the adhesive film may form a barrier to the transfer of gasses into and out of the composite after it is demolded. These gasses may include, for example, carbon dioxide generated in the blowing reaction, residual reactants such as polyisocyanates, catalysts or polyol materials, reaction by-products, air (penetrating into the composite to replace escaping gasses, for example) and the like. In such a case, it is desirable to produce physical openings through the adhesive film to allow gasses to permeate into and out of the composite, as this exchange of gasses tends to reduce the holding time that is needed before the lamination step can be performed. Thus, it is preferred to perforate or slit the adhesive film layer shortly after demolding.

The preferred composite of the invention is manufactured in the form of a vehicle headliner, especially for an automobile or a truck.

Headliners made in accordance with the invention have external dimensions and are shaped to fit onto the ceiling of a passenger compartment of a vehicle. The headliner may incorporate various optional functional or aesthetic features. Supplemental reinforcing layers, such as a scrim or fiber mat as described in WO 2002/04252 may be applied during the step of forming the composite, as described therein. A decorative cover layer may be applied, as described for example in U.S. Pat. No. 6,204,209. Cut-outs for interior lights, mirrors, visors, switches, controls or other accessories may be provided, as may points of attachment for these and other types of accessories. The headliner may be shaped to include ribs (such as for providing head impact protection) or other support structures. Deformable flaps as described in U.S. Pat. No. 5,833,304 may be incorporated into the design.

The reinforcing mat is made up of chopped or continuous fibers that are formed into a mat. The fibers are most conveniently fiberglass, but can be made of other materials such as high-melting polymers like polyamide (nylon) fibers; carbon fibers; natural fibers from a variety of vegetable sources such as sea weed, hemp, coconuts, wheat, corn and flax; metals; and the like. The fibers may be woven or otherwise forming into rovings. Instead, the fibers may be randomly oriented short fibers that are formed into a mat, optionally through the use of a binder material. The fiber mat is sufficiently porous to facilitate penetration of the polyurethane-forming composition, so that a highly uniform composite can be prepared. A suitable mat weight is from 30 to 160 g/m$^2$ (~0.1 to 0.5 ounces/square foot), especially from 75-125 g/m$^2$ (~0.25 to 0.4 ounces/square foot).

As mentioned, optional layers may be applied during the molding step. Of particular interest are reinforcing scrims as described in WO 2002/04252, which may be applied to either or both sides of the fiber mat. Reinforcing scrims are suitably prepared from fibers of the types described before, and as before may be woven or nonwoven (or both). Reinforcing scrims of particular interest are made of an organic polymer such as a polyolefin or a polyester, or a natural fiber as described before. Such a scrim may also contain a quantity of glass fibers in addition to the organic polymer or natural fibers. The reinforcing scrim tends to be heavier, on a weight/unit area basis, than the reinforcing mat. As such, it tends to be less porous and less easily penetrated by the polyurethane-forming composition, although some penetration usually occurs. Even if little penetration occurs, the cured polyurethane functions as an adhesive to bind the scrim. The reinforcing scrims tend to have weights on the order of from 125 to 460 g/m$^2$ (~0.4 to 1.5 ounce/square foot), more suitably from 150-310 g/m$^2$ (~0.5 to 1.0 ounce/square foot).

Another optional layer of particular interest is a polymer film that can function as an adhesive in a subsequent lamination step. The adhesive film is suitably made from a thermoplastic organic polymer that has a melting temperature in the range of from 80° C. to 200° C., especially from 110-160° C., and above the maximum temperature encountered in the molding step. Adhesive films having these melting characteristics can be applied to the assembly prior to or simultaneously with the molding step, to form an assembly having a meltable film on at least one surface. In this manner, the adhesive film conforms to the exterior contours of at least that part of the surface of the assembly which is to be laminated to a show surface or other material in a subsequent step. Typically, the adhesive film becomes bonded to the rest of the assembly though the cured polyurethane.

The adhesive film may itself include reinforcing materials, particularly reinforcing fibers of the type described above. A particularly suitable adhesive film has a thickness of about 1 to about 5 mm, especially about 2 to about 3 mm, and includes from 20 to 80, especially from 30 to 50, g of reinforcing fibers, especially glass fibers, per square meter.

A particularly preferred molded assembly includes a layer of polyurethane-impregnated fiber mat; a reinforcing scrim on at least one side of the layer of polyurethane-impregnated fiber mat, and an adhesive film on at least one side of the assembly. The adhesive film may be attached directly to the layer of polyurethane-impregnated fiber mat, or may be attached to an intermediate reinforcing scrim. The reinforcing scrim layer or layers may be partially or wholly impregnated with the polyurethane.

The polyurethane-forming composition includes at least one organic polyisocyanate, water and at least one polyol. The organic polyisocyanate or mixture thereof advantageously contains an average of at least 2.5 isocyanate groups per molecule. A preferred isocyanate functionality is from about 2.5 to about 3.6 or from about 2.6 to about 3.3 isocyanate groups/molecule. The polyisocyanate or mixture thereof advantageously has an isocyanate equivalent weight of from about 130 to 200. This is preferably from 130 to 185 and more preferably from 130 to 170. These functionality and equivalent weight values need not apply with respect to any single polyisocyanate in a mixture, provided that the mixture as a whole meets these values.

Suitable polyisocyanates include aromatic, aliphatic and cycloaliphatic polyisocyanates. Aromatic polyisocyanates are generally preferred. Exemplary polyisocyanates include, for example, m-phenylene diisocyanate, 2,4- and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI (H$_{12}$ MDI), naphthylene-1,5-diisocyanate, methoxyphenyl-2,4-diisocyanate, 4,4'-biphenylene diisocyanate, 3,3'-dimethyoxy-4,4'-biphenyl diisocyanate, 3,3'-dimethyldiphenylmethane-4,4'-diisocyanate, 4,4',4"-triphenylmethane diisocyanate, polymethylene polyphenylisocyanates, hydrogenated polymethylene polyphenyl polyisocyanates, toluene-2,4,6-triisocyanate and 4,4'-dimethyldiphenylmethane-2,2',5,5'-tetraisocyanate. Preferred polyisocyanates are the so-called polymeric MDI products, which are a mixture of polymethylene polyphenylene polyisocyanates in monomeric MDI. Especially suitable polymeric MDI products have a free MDI content of from 5 to 50% by weight, more preferably 10 to 40% by weight. Such polymeric MDI products are available from The Dow Chemical Company under the trade name PAPI®.

An especially preferred polyisocyanate is a polymeric MDI product having an average isocyanate functionality of from 2.6 to 3.3 isocyanate groups/molecule and an equivalent weight of from 130 to 170. A commercially available product of that type is PAPI® 27, from Dow Chemical.

Isocyanate-terminated prepolymers and quasi-prepolymers (mixtures of prepolymers with unreacted polyisocyanate compounds) can also be used. These are prepared by reacting a stoichiometric excess of an organic polyisocyanate with a polyol, such as the polyols described above. Suitable methods for preparing these prepolymers are well known. Such a prepolymer or quasi-prepolymer preferably has an isocyanate functionality of from 2.5 to 3.6 and an isocyanate equivalent weight of from 130 to 200.

The polyol or polyol mixture has an average of 3.8 to about 8 hydroxyl groups/molecule and a hydroxyl equivalent weight of about 100 to about 135. When a single polyol is used, it should by itself meet these hydroxyl equivalent weight and functionality parameters. If a mixture of polyols is used, the mixture as a whole should meet those parameters, although any individual polyol within the mixture may have a functionality and equivalent weight outside of those ranges. Water is not considered in determining the functionality or equivalent weight of the polyol or polyol mixture.

A preferred average hydroxyl functionality is from about 3.8 to about 6 hydroxyl groups/molecule. A more preferred average hydroxyl functionality is from about 3.8 to about 5 hydroxyl groups/molecule. A preferred average hydroxyl equivalent weight is from about 110 to about 130.

The hydroxyl groups in the polyol or polyol mixture preferably are mostly secondary hydroxyl groups. Suitably at least 70%, at least 80% or at least 90% of the hydroxyl groups are secondary hydroxyl groups, and up to as much as 100% of the hydroxyl groups can be secondary hydroxyl groups. The polyol or polyol mixture is preferably devoid of primary and secondary amino groups, as the present of these groups tends to make the polyurethane-forming composition too reactive to process easily. "Substantially devoid" in this context means that the material under consideration contains no more than trace quantities of such groups, as may be present as impurities. The polyol or polyol mixture may contain tertiary amino groups.

Suitable polyols include polyether polyols, which are conveniently made by polymerizing an alkylene oxide onto an initiator compound (or mixture of initiator compounds) that has multiple active hydrogen atoms. The functionality of the polyol is in most cases determined by the number of active hydrogen atoms on the initiator compound or compounds. Therefore, suitable initiator compound or compounds have an average functionality within the ranges described above with respect to the polyol compounds. The initiator compound(s) may include alkylene glycols (e.g., ethylene glycol, propylene glycol, 1,4-butane diol, 1,6-hexanediol and the like), glycol ethers (such as diethylene glycol, triethylene glycol, dipropylene glycol, tripropylene glycol and the like), glycerine, trimethylolpropane, pentaerythritol, sucrose, glucose, fructose or other sugars, and the like. A portion of the initiator compound may be one containing primary and/or secondary amino groups, such as o-toluene diamine, ethylene diamine, diethanolamine, monoethanolamine, piperazine, aminoethylpiperazine, diisopropanolamine, monoisopropanolamine, methanolamine, dimethanolamine and the like.

As the polyol functionality is at least 3.8, at least one initiator compound having a functionality of 4.0 or greater is used. A preferred initiator mixture is a mixture of sucrose and a trifunctional initiator such as glycerine or trimethylolpropane.

The alkylene oxide of choice is propylene oxide, as it is readily available, is inexpensive, provides secondary hydroxyl groups and generally forms polyols that work well in polyurethane foam applications. Mixtures of propylene oxide and ethylene oxide can be used to form a random copolymer, but in those instances it is preferred to form polyols having mostly secondary hydroxyl groups as before. This can be done by discontinuing the ethylene oxide feed prior to terminating the propylene oxide feed. Butylene oxide, tetramethylene oxide and other alkylene oxides can also be used to form suitable polyether polyols.

Polyester polyols may also be used, but are generally less preferred as they tend to have lower functionalities than desired. They are most beneficially used in combination with other, higher functionality polyols. The polyester polyols include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylol ethane, pentaerythritol, quinitol, mannitol, sorbitol, methyl glycoside, diethylene glycol, triethylene glycol, tetraethylene glycol, dipropylene glycol, dibutylene glycol and the like.

The initiator compounds described before can also be used as components of a polyol mixture in this invention, provided that the equivalent weight and average functionality of the mixture is maintained as described before. Among these, the hydroxyl-containing initiators are preferred. Glycerine is particularly preferred in quantities up to about 2% by total weight of all polyols, as it is believed that glycerine may tie up water and delay cream times somewhat. This provides more working time before the formulation begins to expand.

Preferred polyols which can be used alone (i.e., is the sole polyol) are poly(propylene oxide) polyols, having a functionality of 3.8 to 5.0 hydroxyl groups/molecule and a hydroxyl equivalent weight of 110-130. These are preferably made using a polyol initiator compound. Examples of these are Voranol® 490 polyol and Voranol® 446 polyol, both available from Dow Chemical. These polyols can be used as part of a mixture of one or more additional polyols, provided that the mixture has the average functionality and equivalent weights described before.

Preferred polyols that can be used in polyol mixtures includes those mentioned immediately above, as well as polyols having somewhat higher or lower functionalities and equivalent weights (provided again that the polyol mixture has the average functionality and equivalent weight described before). In addition, amine-initiated polyols may be used as a component in a polyol mixture. Examples of polyols that can be used in polyol mixtures include Voranol® 490 and Voranol® 446 polyols, described above; alcohol-initiated polyols having a functionality of from 2 to about 8, especially from 3.8 to 5 and a hydroxyl equivalent weight of 131-250, especially from 131-175, such as Voranol® 360 polyol (available from Dow Chemical), and amine-initiated polyols having an equivalent weight of from about 65 to about 250, especially from 70 to about 175, such as Voranol® 800 polyol (ethylene diamine-initiated polyol available from Dow Chemical) or Voranol® 391 polyol (o-toluene diamine-initiated polyol available from Dow Chemical).

A preferred polyol mixture is a mixture of 60-99% by weight of an alcohol-initiated polyol having a functionality of 3.8 to 5 and a hydroxyl equivalent weight of from 110-175 with 1-40% by weight of an amine-initiated polyol having a functionality of from 3 to 5 and a hydroxyl equivalent weight of from about 70 to about 175.

One polyol mixture of particular interest is a blend of a sucrose/glycerine-initiated polyol having a functionality of 3.8-5 and a hydroxyl equivalent weight of 110-175 with an ethylene diamine-initiated polyol having a hydroxyl equivalent weight of about 70 to 130. Another polyol mixture of particular interest is a blend of a sucrose/glycerine-initiated polyol having a functionality of 3.8-5 and a hydroxyl equivalent weight of 110-175 with an o-toluene diamine initiated polyol having a hydroxyl equivalent weight of about 110 to 175. In each case, the individual polyols and their proportions are selected such that the polyol mixture will have an average functionality and equivalent weight within the ranges described before.

Another polyol mixture of particular interest is a blend of a sucrose/glycerine-initiated polyol having a functionality of 3.8-5 and a hydroxyl equivalent weight of 110-175 with up to 2 weight percent (based on combined weight of all polyols) of glycerine.

Water is used as a chemical blowing agent in the formulation. Water is used in an amount within the range of 3.0 to 5.5 parts by weight per 100 parts by weight of polyol(s). A preferred range is from about 3.5 to about 4.5 parts of water per 100 parts by weight polyol.

The polyisocyanate and polyol components are reacted at an isocyanate index of from 90 to 130. Isocyanate index is calculated as the number of reactive isocyanate groups provided by the polyisocyanate component divided by the number of isocyanate-reactive groups in the foam formulation (including isocyanate-reactive blowing agents such as water) and multiplying by 100. Water is considered to have two isocyanate-reactive groups per molecule for purposes of calculating isocyanate index. A preferred isocyanate index is from 100 to 125.

The polyurethane-forming composition may include a physical blowing agent, in addition to the water, but this is generally less preferred. Such physical blowing agents include hydrocarbons, fluorocarbons, hydrofluorocarbons, chlorocarbons, chlorofluorocarbons and hydrochlorofluorocarbons. It is most preferred to exclude a physical blowing agent from the composition.

The reactive system includes at least one catalyst for the reaction of the polyol(s) and the polyisocyanate. Suitable urethane-forming catalysts include those described by U.S. Pat. No. 4,390,645 and in WO 02/079340, both incorporated herein by reference. Representative catalysts include tertiary amine and phosphine compounds, chelates of various metals, acidic metal salts of strong acids; strong bases, alcoholates and phenolates of various metals, salts of organic acids with a variety of metals, organometallic derivatives of tetravalent tin, trivalent and pentavalent As, Sb and Bi and metal carbonyls of iron and cobalt. These catalysts also tend to promote the water-isocyanate reaction.

Tertiary amine catalysts are generally preferred. Particularly preferred are tertiary amine catalysts that promote the reaction of the polyisocyanate with the polyol more strongly than the polyisocyanate-water reaction. It has been found that by using these so-called "gelling" catalysts rather than the "blowing" catalysts (i.e., those that more strongly promote the isocyanate-water reaction), a reaction profile can be obtained that is particularly suitable for forming molded composites. Among the suitable gelation catalysts are dimethylbenzylamine (such as Desmorapid® DB from Rhine Chemie), 1,8-diaza (5,4,0)undecane-7 (such as Polycat® SA-1 from Air Products), dimethylcyclohexylamine (such as Polycat® 8 from Air Products), triethylene diamine (such as Dabco® 33LV from Air Products), dimethyl ethyl amine, n-ethyl morpholine, N-alkyl dimethylamine compounds such as N-ethyl N,N-dimethyl amine and N-cetyl N,N-dimethylamine, N-alkyl morpholine compounds such as N-ethyl morpholine and N-coco morpholine, and the like. Other gelation catalysts that are useful include those sold by Air Products under the trade names Dabco® NE 1060, Dabco® NE1070, Dabco® NE500, Polycat® 1058, Polycat® 11, Polycat 15, Polycat® 33 and Dabco® MD45, and those sold by Huntsman under the trade names ZR 50 and ZR 70. Mixtures of two or more of the foregoing can be used. For example, a mixture of triethylene diamine with either or both of dimethyl benzyl amine and N,N-dimethylcyclohexylamine, particularly a combination of all three of these, is a very suitable catalyst package.

A particularly preferred catalyst package is substantially devoid of organometallic catalysts and isocyanate trimerization catalysts. An even more preferred catalyst package is substantially devoid of organometallic catalysts, trimerization catalysts and "blowing" catalysts. In general, the preferred catalyst package contains less than 5 weight percent, especially less than 2 weight percent, of such catalysts, based on the total weight of the catalyst package.

The catalyst is used in catalytically sufficient amounts. For the preferred tertiary amine gellation catalysts, a suitable amount of the catalysts is from about 4 to about 8 parts, especially from about 5.5 to about 7 parts, of tertiary amine catalyst(s) per 100 parts by weight of the polyol(s). These amounts tend to represent catalyst concentrations that are higher than is typical in polyurethane foam formulations. The high catalyst level, together with the preferred selection of gellation catalysts and selection of polyol is believed to help provide a desirable reaction profile. In cases in which the polyol or polyol mixture contains tertiary amino groups, the catalyst levels may be decreased somewhat due to the catalytic nature of the tertiary amine groups.

The polyurethane-forming composition also preferably contains at least one surfactant, which helps to stabilize the cells of the composition as gas evolves to form bubbles and expand the foam. Organosilicone surfactants are generally preferred types. A wide variety of these organosilicone surfactants are commercially available, including those sold by Goldschmidt under the Tegostab® name (such as Tegostab B-8462, B8427, B8433 and B-8404 surfactants), as well as various surfactant products commercially available from Air Products and Chemicals, such as DC-193, DC-198, DC-5000, DC-5043 and DC-5098 surfactants.

In addition to the foregoing ingredients, the polyurethane-forming composition may include various auxiliary components, such as fillers, colorants, odor masks, flame retardants, biocides, antioxidants, UV stabilizers, antistatic agents, viscosity modifiers, and the like.

Examples of suitable flame retardants include phosphoros compounds, halogen-containing compounds and melamine.

Examples of fillers and pigments include calcium carbonate, titanium dioxide, iron oxide, chromium oxide, azo/diazo dyes, phthalocyanines, dioxazines and carbon black.

Examples of UV stabilizers include hydroxybenzotriazoles, zinc dibutyl thiocarbamate, 2,6-ditertiarybutyl catechol, hydroxybenzophenones, hindered amines and phosphites.

Except for fillers, the foregoing additives are generally used in small amounts, such as from 0.01 percent to 3 percent each by weight of the polyurethane formulation. Fillers may be used in quantities as high as 50% by weight of the polyurethane formulation.

A viscosity modifier may be used in either the polyol or isocyanate components if needed or desired to bring the viscosity of that component into a particular range. A viscosity modifier will be used most commonly in cases in which the polyol is viscous relative to the polyisocyanate. In such a case, a viscosity modifier can be added to more closely match the viscosity of the polyol component with that of the polyisocyanate. The viscosity modifier preferably is not reactive with the polyol, water or polyisocyanate, although it may perform other functions (such as providing flame retardance). It is generally preferred to use components that have a viscosity of 1500 cps or less at 25° C., and in such a case, a viscosity modifier may be blended with one or more of the components in order to bring the viscosity down into that range.

The polyurethane-forming composition is prepared by bringing the various components together immediately prior to applying the composition to the fiber mat. Many of the ingredients may be blended together beforehand, provided that no isocyanate-reactive materials are blended with the polyisocyanate until just prior to application. For example, polyol, catalysts, water and surfactant may be combined beforehand to create a formulated polyol component which is then mixed with the polyisocyanate and applied to the fiber mat. Mixing of the components with the polyisocyanate is conveniently done using equipment such as impingement mixers, static mixers and other mixing devices. The preferred method of application to the fiber mat is spraying. Equipment for mixing and spraying a polyurethane-forming composition is available from Admiral Equipment Company. Mixing is preferably performed at a temperature of less than 50° C., such as from 0 to 35° C. or from 0 to 25° C., to help prevent premature reaction before the impregnated mat can be transferred to the mold.

The polyurethane composition desirably exhibits a somewhat delayed cream time, followed by a rapid cure when exposed to elevated temperatures within the mold as described before. "Cream time" is the time that elapses from the initial mixing and dispensing of the polyurethane-forming composition (in the typical process, through the spray head) until a visible reaction occurs. Cream times of 8 to 15 seconds are particularly suitable. The desired rapid cure is manifested in demold times, which are suitably within the ranges described before.

The headliner of the invention can be installed within a vehicle passenger compartment in various ways. The particular manner of fastening the headliner in place is not considered critical to the invention. Various forms of snaps, rivets, magnets, adhesive means and the like are all useful.

The following examples are provided to illustrate the invention but are not intended to limit the scope thereof. All parts and percentages are by weight unless otherwise indicated.

EXAMPLE 1

A composite is prepared and molded in a modified aluminum mold to simulate vehicle headliner manufacturing conditions. The mold is an electrically heated aluminum mold equipped with an air bladder for sealing and degassing the tool. The internal dimensions of the mold are 20 inches×20 inches (51 cm×51 cm), with a depth of about 12-25 mm (½ to 1 inch). An insert is placed in the mold to reduce the depth in some areas to 4-8 mm while leaving the depth in other areas at 10-16 mm.

A polyurethane composition is prepared from the following components:

TABLE 1

| Component | Parts by Weight |
|---|---|
| Polyether Polyol A[1] | 88.2 |
| Silicone Surfactant A[2] | 2.0 |

TABLE 1-continued

| Component | Parts by Weight |
|---|---|
| Gelling Catalyst A[3] | 2.5 |
| Gelling Catalyst B[4] | 1.0 |
| Gelling Catalyst C[5] | 2.0 |
| Colorant | 0.5 |
| Water | 3.8 |
| Polymeric MDI[6] | to 105 index |

[1]A sucrose/glycerine-initiated poly(propylene oxide) having a hydroxyl equivalent weight of about 115 and a functionality of 4.1 hydroxyl groups/molecule, sold as Voranol 490 by Dow Chemical;
[2]An organosilicone surfactant sold as Tegostab ®B8404 from Th. Goldschmidt;
[3]A triethylenediamine solution sold by Air Products as Dabco ® 33LV;
[4]A dimethylbenzylamine catalyst sold by Rhine Chemie as Desmorapid ® DB;
[5]A dimethylcyclohexyl amine catalyst sold by Air Products as Polycat ® 8.
[6]Sold as PAPI ® 27 by Dow Chemical.

All components except the polyisocyanate are blended to form a formulated polyol component. The formulated polyol component is brought to a temperature of 25° C. and the polyisocyanate is brought to a temperature of about 27° C. The formulated polyol component and the polyisocyanate component are mixed at a weight ratio of about 0.65 (to provide an isocyanate index of about 105) using a Hi-Tech HP foam machine with a Gusmer Admiral L HP head, and injected into the mold (preheated to 55-65° C.) at a pressure of about 15.5 MPa (~2250 pounds/square inch). Throughput under these conditions is about 800 g/sec.

Repeated moldings are made using different demolding times. The dimensions of the molded parts are measured after demolding and compared to the thickness of the mold, in order to assess post-demold expansion. The shortest demold time which provides satisfactory post-demold expansion (defined for purposes of these parts as a linear expansion of no greater than 0.75 mm at any measured point on the molding) is considered to be the demold time for the composite. The demold time for this composite is less than 60 seconds.

EXAMPLE 2

Example 1 is repeated, this time increasing the amount of water to 4.3 parts by weight and reducing the amount of polyol to 87.7 parts by weight. Demold time is again less than 60 seconds.

Comparative Sample A

Example 1 is again repeated, this time using a polyurethane-forming composition as follows. The polyols in this formulation have an average functionality of about 4.1 and an average hydroxyl equivalent weight of 137.

TABLE 2

| Component | Parts by Weight |
|---|---|
| Polyether Polyol B[1] | 78.65 |
| Polyether Polyol C[2] | 10 |
| Silicone Surfactant B[3] | 1.5 |
| Gelling Catalyst A[4] | 1.5 |
| Gelling Catalyst B[5] | 1.5 |
| Gelling Catalyst C[6] | 1.8 |
| Gelling Catalyst D[7] | 1.2 |

TABLE 2-continued

| Component | Parts by Weight |
| --- | --- |
| Colorant | 0.45 |
| Water | 3.4 |
| Polymeric MDI[8] | To 105 index |

[1]A sucrose/glycerine-initiated poly(propylene oxide) having a hydroxyl equivalent weight of about 156 and a functionality of 4.1 hydroxyl groups/molecule, sold as Voranol 360 by Dow Chemical;
[2]An ethylene diamine-initiated polyol having a hydroxyl equivalent weight of 70 and a functionality of 4.0 hydroxyl groups/molecule, sold as Voranol 800 by Dow Chemical;
[3]An organosilicone surfactant sold as Tegostab ®B8427 by Th. Goldschmidt;
[4-6]See notes 3–5 of Table 1.
[7]An amine catalyst sold by Crompton Corp. as Niax ® A-537.
[8]See note 6 to Table 1.

The demold time for this composition is determined to be in excess of 70 seconds, using the method described in Example 1.

EXAMPLE 3

Comparative Sample A is repeated, except the polyurethane-forming composition is modified to contain 68.05 parts of Polyether Polyol B, 20 parts of Polyether Polyol C and 4 parts of water. The polyol mixture has an average functionality of about 4.1 and an average hydroxyl equivalent weight of 122. The demold time for this formulation is about 50 seconds.

This polyurethane-forming composition is then evaluated to make vehicle headliners on a production line. The tool in this case is a mold having a cavity that varies in thickness, so that the molded part has areas that are 6, 8 and 14 mm thick. All components except the polyisocyanate are blended to form a formulated polyol component which is adjusted to about 25° C. The polyisocyanate is adjusted to about 27° C. The polyol component and polyisocyanate are mixed and sprayed onto a woven glass mat having a weight of about 105 g/m² (0.34 ounces/square foot). Immediately after applying the polyurethane-forming composition, a nonwoven polyolefin scrim that contains a layer of glass fibers is brought into contact with the bottom of the impregnated mat, and a 2.5 mm-thick polyethylene adhesive film layer (containing 40 g/m² of glass fibers) is brought into contact with the top side of the impregnated mat. The entire assembly is then transferred into a preheated (~60° C.) mold. Demold times are determined in the general manner described in Example 1. The demold time for this composite is about 60 seconds under these conditions.

Upon demolding, slits are cut into the adhesive film layer. The composite is then allowed to sit for 20 minutes before being heat laminated to a foam-backed fabric. The lamination temperature is about 150° C. No bubbling or other distortion of the composite is seen during or after the lamination step.

EXAMPLE 4

A polyurethane-forming composition is prepared from the following ingredients:

TABLE 3

| Component | Parts by Weight |
| --- | --- |
| Polyether Polyol A[1] | 87.7 |
| Silicone Surfactant B[2] | 2 |
| Gelling Catalyst A[3] | 2.5 |
| Gelling Catalyst B[4] | 1 |
| Gelling Catalyst C[5] | 2 |
| Colorant | 0.5 |

TABLE 3-continued

| Component | Parts by Weight |
| --- | --- |
| Water | 4.3 |
| Polymeric MDI[6] | To 105 index |

[1]See note 1, Table 1.
[2]See note 3, Table 2.
[3-6]See notes 3–6 of Table 1.

A composite is prepared using this formulation, in the general manner described in Table 1. The composite has a demold time of approximately 50 seconds. The shot weight required to obtain good quality parts is about 2950 grams of polyurethane-forming composition.

A vehicle headliner is then prepared on a production line using this formulation, in the manner described in Example 3. The demold time is less than 60 seconds, and the lamination step can be successfully conducted after aging the molded composite for only about 20 minutes.

Comparative Sample B

A vehicle headliner is made in the general manner described in Example 3. The polyurethane-forming formulation is the same as described in Comparative Sample A, except 88.65 parts of Polyether Polyol B are used and no Polyether Polyol C is used. This formulation requires a shot size of over 3200 grams to fill the mold. Demold times are at least 80 seconds. The parts must be aged for approximately 2 hours before they can be used satisfactorily in the heat lamination step.

EXAMPLES 5 AND 6

Polyurethane-forming compositions are prepared from the following ingredients, using the general method described in Example 1, except the tool is a commercial-scale headliner tool and the application rate is 900 g/second.

TABLE 4

| | Parts By Weight | |
| --- | --- | --- |
| Component | Example 5 | Example 6 |
| Polyether Polyol A[1] | 86.96 | 86.66 |
| Glycerine | 1.0 | 1.0 |
| Silicone Surfactant C[2] | 2.0 | 2.0 |
| Gelling Catalyst A[3] | 2.5 | 2.5 |
| Gelling Catalyst B[4] | 1.0 | 1.0 |
| Gelling Catalyst C[5] | 2.0 | 2.0 |
| Blowing Catalyst A[6] | 0.04 | 0.04 |
| Colorant | 0.5 | 0.5 |
| Water | 4.0 | 4.3 |
| Polymeric MDI[7] | To 105 index | To 105 index |

[1]See note 1, Table 1.
[2]A silicone surfactant commercially available from Th. Goldschmidt as Tegostab™ B-8433.
[3-5]See notes 3–5 of Table 1.
[6]A tertiary amine blowing catalyst sold by Air Products and Chemicals as Niax A-99 catalyst.
[7]See note 6 of Table 1.

Demold time is evaluated in this case by determining the in-mold time required for the part to be demolded without visible splits. Demold time is less than one minute.

What is claimed is:

1. A process comprising
   a) applying a foamable polyurethane composition onto a mat of at least one reinforcing fiber to form an impregnated mat;
   b) molding the impregnated mat at an elevated temperature sufficient to cure the polyurethane composition, to form a molded, fiber-reinforced polyurethane foam, and
   c) demolding the fiber-reinforced polyurethane foam,
   wherein the foamable polyurethane composition comprises a polyol or mixture of polyols, a polyisocyanate and about 3.0 to about 5.5 parts of water per 100 parts by weight of polyol(s), the polyol or mixture of polyols having an average of 3.8 to about 8 hydroxyl groups/molecule and a hydroxyl equivalent weight of about 100 to about 135, wherein at least 70% of the hydroxyl groups contained in the polyol or mixture of polyols are secondary hydroxyl groups and the polyol or polyol mixture is substantially devoid of primary or secondary amino groups, and further wherein the polyisocyanate index is from 90 to 130, wherein step c) is performed within 60 seconds of the beginning of step b).

2. The process of claim 1, wherein the foamable polyurethane composition further includes at least one tertiary amine catalyst.

3. The process of claim 2, wherein the tertiary amine catalyst is a gelling catalyst.

4. The process of claim 2, wherein the tertiary amine catalyst is a mixture of tertiary amine catalysts containing no more than 5% by weight of an organometallic catalyst, a trimerization catalyst and a blowing catalyst.

5. The process of claim 4 wherein the foamable polyurethane composition is substantially devoid of an organometallic catalyst, a trimerization catalyst and a blowing catalyst.

6. The process of claim 4, wherein the polyol or mixture of polyols has an average of 3.8 to 5 hydroxyl groups per molecule and a hydroxyl equivalent weight of from 110-130.

7. The process of claim 6 wherein the polyol or polyol mixture contains up to 2% by weight, based on the weight of polyols, of glycerine.

8. The process of claim 6, wherein gelling catalyst includes triethylene diamine, dimethylbenzylamine, dimethylcyclohexyl amine or a combination of two or more thereof.

9. The process of claim 1 wherein the mat is of a chopped or continuous fiberglass.

10. The process of claim 1 wherein prior to step b), at least one additional layer is brought into contact with the impregnated mat to form a multilayer structure, and the multilayer structure is molded in step b).

11. The process of claim 10 wherein said additional layer is a reinforcing scrim or a film.

12. The process of claim 1, further comprising d) heat laminating the molded-fiber-reinforced polyurethane foam to at least one show surface.

13. The process of claim 12, wherein said show surface is a foam-backed film or sheet.

14. A process comprising
   a) applying a foamable polyurethane composition onto a mat of at least one reinforcing fiber to form an impregnated mat;
   b) applying a thermoplastic adhesive film to at least one surface of the impregnated mat;
   c) prior to, simultaneously with or after step b), inserting the impregnated mat into a mold;
   d) molding the impregnated mat at an elevated temperature sufficient to cure the polyurethane composition but below the melting temperature of the thermoplastic adhesive film, to form a molded, fiber-reinforced polyurethane foam having an adhesive film on at least one surface thereof,
   e) demolding the fiber-reinforced polyurethane foam;
   f) applying a show surface to the adhesive film and
   g) heating the adhesive film to a temperature above its melting temperature to bond the show surface to the fiber-reinforced polyurethane foam,
   wherein the foamable polyurethane composition comprises a polyol or mixture of polyols, a polyisocyanate and about 3.0 to about 5.5 parts of water per 100 parts by weight of polyol(s), the polyol or mixture of polyols having an average of 3.8 to about 8 hydroxyl groups/molecule and a hydroxyl equivalent weight of about 100 to about 135, and further wherein the polyisocyanate index is from 90 to 130.

15. The process of claim 14 wherein the fiber-reinforced polyurethane foam is demolded within 60 seconds of the start of step c).

16. The process of claim 15 wherein step g) is performed within 1 hour of step e).

17. The process of claim 16, wherein step g) is performed within 30 minutes of step e).

18. The process of claim 16 wherein at least one scrim layer is applied to a surface of the impregnated mat prior to step d).

19. The process of claim 4 wherein the composition contains up to about 0.10 part by weight of a blowing catalyst per 100 parts by weight polyol(s).

* * * * *